United States Patent [19]
Rambauske

[11] 3,950,079

[45] Apr. 13, 1976

[54] STEERABLE CATOPTRIC ARRANGEMENTS

[75] Inventor: Werner R. Rambauske, Carlisle, Mass.

[73] Assignee: Raytheon Company, Lexington, Mass.

[22] Filed: Aug. 19, 1974

[21] Appl. No.: 498,686

[52] U.S. Cl. .............. 350/285; 350/289; 350/294
[51] Int. Cl.² ......................................... G02B 5/10
[58] Field of Search ......... 350/48, 49, 50, 285, 289, 350/293, 294

[56] References Cited
UNITED STATES PATENTS

| | | | |
|---|---|---|---|
| 2,819,649 | 1/1958 | McLeod et al. .................... | 350/294 |
| 3,383,151 | 5/1968 | Kohler et al. ..................... | 350/48 |
| 3,492,474 | 1/1970 | Yamaguchi et al. ........ | 350/293 UX |
| 3,790,257 | 2/1974 | Goldstein et al. .................. | 350/293 |

Primary Examiner—Alfred E. Smith
Assistant Examiner—Richard A. Rosenberger
Attorney, Agent, or Firm—Philip J. McFarland; Joseph D. Pannone

[57] ABSTRACT

Catoptric arrangements for steering a laser beam by moving one, or more, mirrors relative to two substantially orthogonal axis of rotation are shown. In the various embodiments illustrated, one of such axes of rotation, around which all of the mirrors in each embodiment are rotatable, is coincident with the longitudinal axis of the laser beam to be steered so as to direct such longitudinal axis toward different points on a first focal circle. Means are provided to rotate all of the mirrors in each embodiment, except the mirror irradiated by the laser beam to be steered, around the second axis of rotation to direct the longitudinal axis of such beam toward different points on a second focal circle substantially orthogonal to the first focal circle. Also shown are exemplary modifications to position the mirrors within each arrangement to aim the steered beam to points adjacent to the first and second focal circles.

10 Claims, 7 Drawing Figures

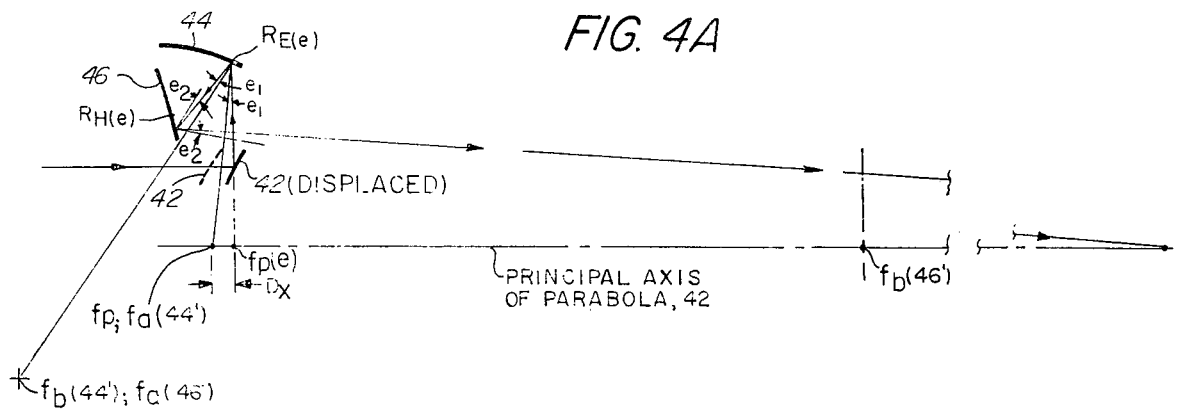

STEERABLE CATOPTRIC ARRANGEMENTS

BACKGROUND OF THE INVENTION

This invention pertains generally to mirror arrangements for directing a beam of wave-propagated energy and particularly to mirror arrangements for steering a laser beam.

It has been known for many years in the art that the direction of a beam of wave propagated energy, as for example a beam of light, may be changed by reflecting light from one or more movable mirrors. By controlling the orientation of each one of such mirrors with respect to the longitudinal axis of the beam being directed, the final direction of the beam may be changed, within relatively wide limits, as desired.

When it is desired to steer a beam wherein radiant flux density is relatively high, as for example a laser beam, conventional flat or curved mirrors may not be capable of withstanding damage from the beam being directed. To overcome such a difficulty, it is known in the art that steerable mirror arrangements may be made following the disclosure in my U.S. Pat. No. 3,790,258, assigned to the same assignee as this application. Briefly, according to my just cited patent, a steerable catoptric arrangement usable with a high powered source, such as a laser, may be provided by two sets of mirrors, the first being adapted to focus a laser beam to be steered to a point (or, alternatively, to form a collimated beam from such laser beam) aand the second set being adapted to be movable about the point (or, alternatively, to be movable with respect to the collimated beam) and to form an emergent beam whose direction may be changed as desired. While the various embodiments shown in my cited patent are useful in many applications, experience has proven that the number of reflecting surfaces required may militate against the use of any of such embodiments in some applications. For example, if a transportable system is desired to allow the beam from a high powered laser to be aimed at any point within a field surrounding a vehicle, it is extremely important, if not essential, that the beam steering arrangement have as few reflecting surfaces as possible. In other words, for obvious reasons of efficiency, weight and size, the number of mirrors making up the beam steering arrangement to direct the beam from a transportable high powered laser should be kept to a minimum.

It is highly desirable that any steerable catoptric arrangement be disposed so that the position of the "focused" beam be controllable with a high degree of precision. That is, it is highly desirable in many cases to provide means which allow the position of a steered beam to be controlled with a higher degree of precision than is possible when any conventional gearing mechanism is used to move one or more mirrors relative to a beam to be steered to effect steering.

SUMMARY OF THE INVENTION

Therefore, it is a primary object of this invention to provide an improved steerable catoptric arrangement.

Another object of this invention is to provide an improved steerable catoptric arrangement utilizing a minimum number of mirrors.

The foregoing objects of this invention, and other objects to be discerned, are generally attained by providing at least a first and a second confocal mirror disposed sequentially in a beam from a laser, the supporting means for the two such mirrors being adapted to allow rotation of both together around the longitudinal axis of such beam and to allow rotation of the second such mirror, with respect to the first, around an axis at least substantially orthogonal to the longitudinal axis of such beam. In preferred embodiments, additional mirrors, supported so as to move synchronously with the second confocal mirror, may be provided to focus, or collimate, the laser energy reflected from the second confocal mirror.

BRIEF DESCRIPTION OF THE DRAWINGS

For a more complete understanding of this invention, reference is now made to the following description of the accompanying drawings, wherein.

DESCRIPTION OF THE PREFERRED EMBODIMENTS

Figure 1:
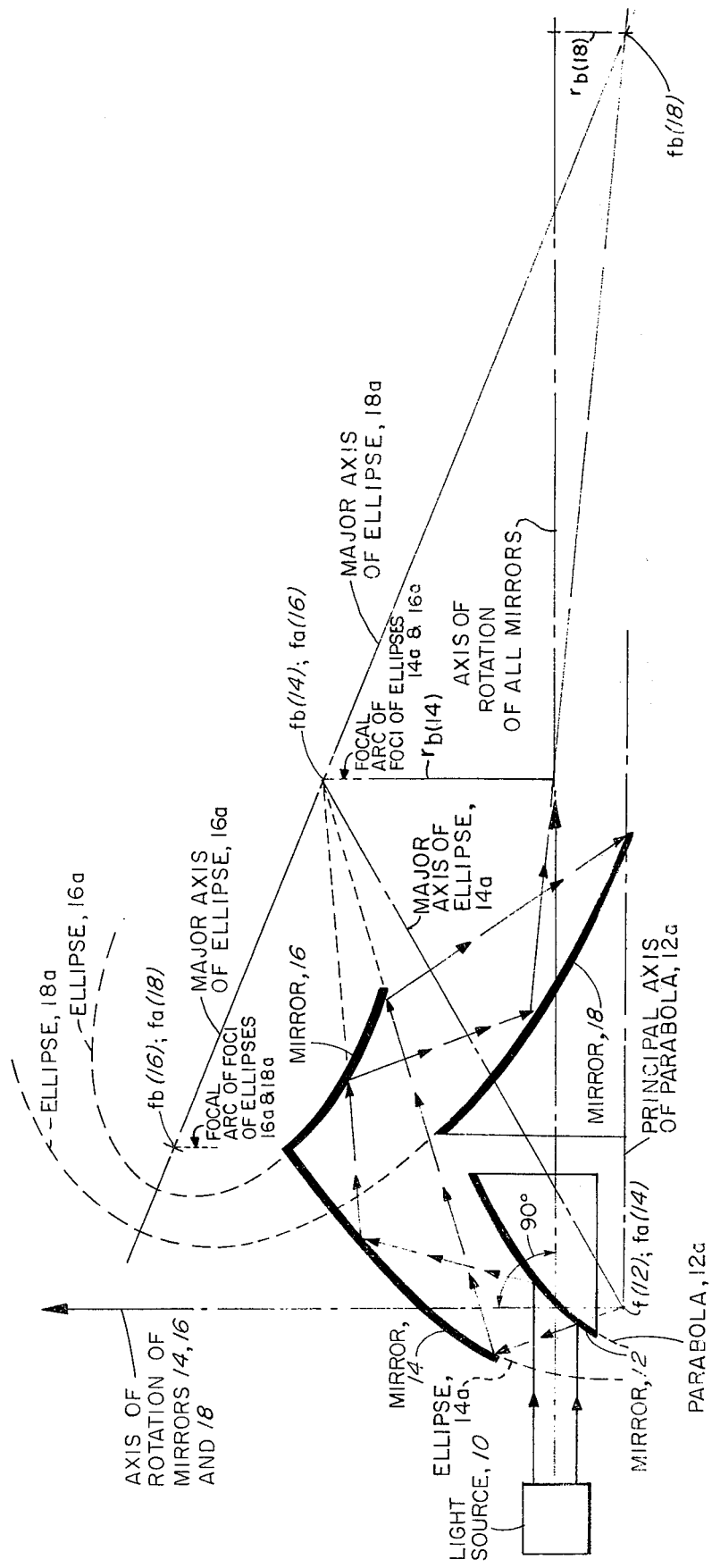
FIG. 1 is a cross-sectional sketch illustrating how mirrors may be arranged according to my inventive concepts to steer and focus a beam of light which is deemed to be collimated.

Referring now to FIG. 1, it may be seen that a mirror 12 and a mirror 14 constitute the first and the second confocal mirrors disposed sequentially to direct a collimated beam from a light source 10. Mirror 12 has a reflecting surface, hereinafter sometimes referred to as a sector of a truncated paraboloid, corresponding to the surface generated by rotating a first generatrix consisting of a selected segment (indicated by a heavy line) of a parabola 12a around its principal axis. It is noted here that, although the first generatrix may be rotated completely around the principal axis of the parabola 12a, only a portion of the resulting reflecting surface will be irradiated. Therefore, it is preferred that the first generatrix be rotated (say through an angle in the order of 60°), partially around the principal axis of the parabola 12a.

Mirror 14 has a reflecting surface, hereinafter sometimes referred to as a Rambauske ellipsoid, as defined hereinafter, corresponding to the surface formed by nutating a second generatrix consisting of a selected segment (indicated by a heavy line) of an ellipse 14a about the principal axis of the parabola 12a. One focal point, $fa(14)$, of the ellipse 14a is confocal with the focal point, $f(12)$, of the parabola 12a and the second focal point, $fb(14)$, then describes a circle, centered on the line marked "axis of rotation of all mirrors" and lying in a plane orthogonal to such line. As was the case with the first generatrix, only a portion of the reflecting surface resulting from a complete nutation of the second generatrix will be irradiated. It follows then that it is preferred that the second generatrix be nutated partially around the principal axis of the parabola 12a.

Before describing the remaining elements in FIG. 1, the operation of the mirrors 12 and 14 will first be described because the contemplated movements of those two mirrors illustrate the concept I have for steering a collimated beam. Thus, if the longitudinal axis of a beam to be steered and the principal axis of the parabola 12a are parallel as shown, rotation of the mirror 12 about the longitudinal axis of the beam to be steered causes the focal point $f(12)$ to move about such axis along a circular arc, centered on such axis and lying in a plane orthogonal to such axis. All rays in the beam to be steered appear after reflection to have originated from the focal point $f(12)$. Therefore, the axis of the divergent beam reflected from the mirror 12 is rotated around the line marked axis of rotation of all mirrors. With mirror 14 being rotated along with mirror 12, the first focal point, $fa(14)$, of the mirror 14 remains in coincidence with the first focal point, $f(12)$, of mirror 12 and the arc described by the second focal point, $fb(14)$, moves along a circular arc centered on the line marked axis of rotation of all mirrors in a plane orthogonal to that line. Consequently, the divergent beam reflected from mirror 12 is converted into a convergent beam directed toward points on the arc described by the second focal point, $fb(14)$, of the mirror 14.

It will be noted that, as mirrors 12 and 14 are rotated about the line marked axis of rotation of all mirrors, the line marked "axis of rotation of mirrors 14, 16 and 18" is similarly rotated. Therefore, if the mirror 14 is rotated about the latter line, the arc described by the second focal point, $fb(14)$, of the mirror 14 will move along a circular arc centered on the latter line and lying in a plane orthogonal thereto. It may be seen, therefore, that rotation of both mirrors 12 and 14 together around a first line and rotation of mirror 14 relative to mirror 12 around a second line orthogonal to the first line, causes the second focal point $fb(14)$ to move over a curved surface. That is, by reason of such motions, the direction of a collimated beam from a light source is changed, or steered.

It will be appreciated that if both mirrors 12 and 14 were to be rotated together through 360° around the line marked axis of rotation of all mirrors and if mirror 14 alone could be rotated through 360° around the line marked axis of rotation of mirrors 14, 16 and 18, the locus of the arc described by the focal point $f_{b(14)}$ would approximate the surface of a sphere centered at $f_{(12)}$, i.e. such locus would approximate what may be called the theoretical focal field of mirror 14. If, however, rotation of both mirrors is constrained to angles less than 360°, then the locus of the arc described by the focal point $f_{b(14)}$ would approximate a spherical cap of the sphere forming the "theoretical" focal field of the mirror 14. The amount of rotation of the mirror 14 with respect to the mirror 12 would determine the size of such spherical cap, or actual focal field of the mirror 14.

If the curvature of the actual focal field of mirror 14 is not material in a given instance, then the two-mirror arrangement just described is adequate. If, however, it is required that the actual focal field be relatively flat, limited in size, or at a relatively long distance from the mirror arrangement, then the mirrors 12 and 14 must be larger in area than those shown. This leads to almost insuperable problems in the production of the required mirrors. Further, it will be observed that, if orthogonality between the axes of rotation is to be preserved, simply enlarging the mirrors may permit vignetting of light reflected from the Rambauske ellipsoidal mirror to occur.

To reduce the magnitude of problems such as just mentioned, a pair of mirrors 16 and 18 may be disposed in the path of the converging beam reflected from mirror 14. Thus, mirror 16, having a convex reflecting surface as shown, is formed by nutating a generatrix (which is a segment of an ellipse 16a having a first focal point confocal with the ellipse 14a and a second focal point $f_{b(16)}$ as shown) about the "principal axis of the parabola 12a". Similarly, mirror 18, having a concave reflecting surface as shown, is formed by nutating a generatrix (which is a segment of an ellipse 18a having one focal point $f_{a(18)}$ confocal with the focal point $f_{b(16)}$ of ellipse 16a and, preferably, a second focal point $f_{b(18)}$ on the principal axis of the parabola 12a).

With mirrors 14, 16 and 18 mounted so that all rotate together, the described confocality conditions between them are preserved under all conditions. It follows, then, that the converging beam from mirror 14 is converted, on reflection from mirror 16, to a diverging beam apparently originating at points on the arc described by focal point $f_{b(16)}$ and such diverging beam is then reconverted back into a converging beam directed toward the focal point $f_{b(18)}$.

It will be observed that, if all of the mirrors are rotated about the line marked axis of rotation of all mirrors, focal point $f_{b(18)}$ will follow a circular arc centered on such line. Further, if mirrors 14, 16 and 18 are rotated (relative to mirror 14) about the line marked axis of rotation of mirrors 14, 16 and 18, focal point $f_{b(18)}$ will follow a circular arc centered on such line. In other words, as was the case when only mirrors 12 and 14 were considered, the focal point $f_{b(18)}$ may be caused to move over the surface of a spherical zone of a sphere centered at $f_{(12)}$. Now, however, the radius of the spherical cap equals the distance between the focal point $f_{(12)}$ and the focal point $f_{b(18)}$.

While it may be assumed in many applications that the rays in the beam to be steered are parallel, such an assumption is not universally valid. As is very well known, diffraction occurs when light passes through any finite aperture. If, therefore, the light from the light source 10 passes through an aperture (not shown) which diffracts the beam to be steered to an appreciable degree for any given application, aberrations are suffered by the light reflected from the paraboloidal reflecting surface of the mirror 12. To avoid such aberrations, the arrangement shown in FIG. 2 may be used. In such arrangement mirrors 14, 16 and 18 may be the same as the correspondingly identified mirrors in FIG. 1. Mirror 12' differs from mirror 12 in that the generatrix of the reflecting surface of the former is a segment of one branch of a hyperbola 12'a. Such hyperbola has one focal point $f_{b(12')}$, corresponding to focal point $f_{(12)}$ in FIG. 1, and a second focal point $f_{a(12')}$. The light source (not shown in FIG. 2 but assumed to be a laser producing a beam which diverges substantially in the instant case) is positioned so that the apparent origin of such beam concides with the second focal point, $f_{a(12')}$, of the hyperbola 12'a. The reflecting surface of the mirror 12' corresponds in shape to the shape formed by rotating the generatrix about the axis of symmetry of the divergent beam from the laser. Therefore, when such a mirror is substituted for mirror 12 of FIG. 1 and illuminated by the divergent beam, a reflected divergent beam, apparently originating at focal point $f_{k12'}$, is formed. Such beam is then directed, as described in connection with FIG. 1, through the remaining portion of the arrangement to focal point $f_{k18}$.

Figure 2:
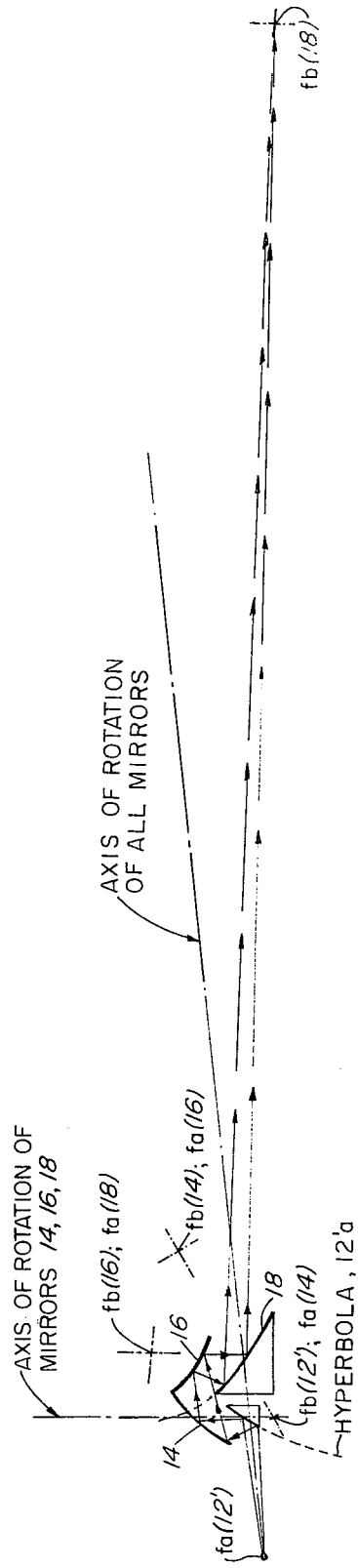
FIG. 2 is a cross-sectional sketch illustrating how mirrors may be arranged according to my inventive concepts to steer and focus a divergent beam, as a beam from a laser.

It will be noted here that the line marked axis of rotation of all mirrors and the line marked axis of rotation of mirrors 14, 16 and 18 are not mutually orthogonal in FIG. 2. It has been found, however, that the deviation from orthogonality need not exceed a few degrees so the distortion in the actual focal field defined by possible positions of focal point $f_{k18}$ is small.

Figure 3:
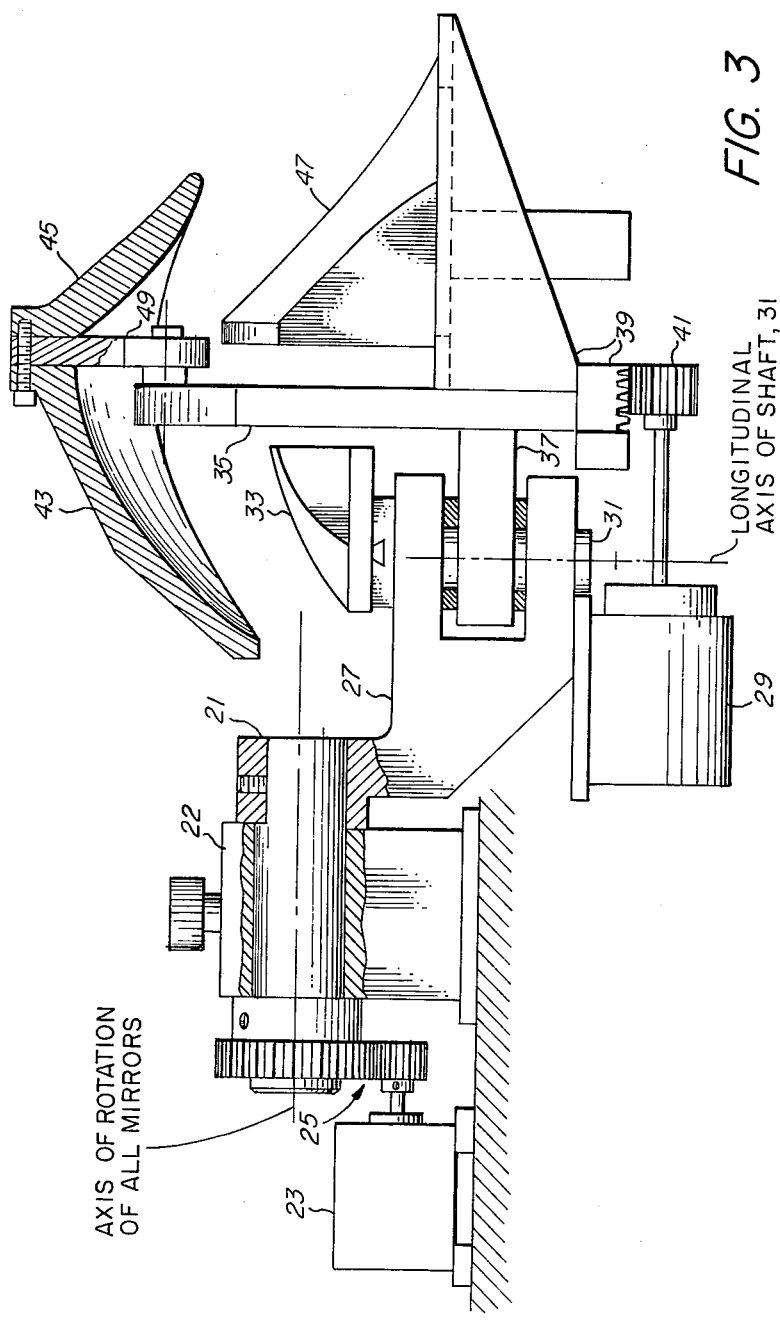
FIG. 3 is a side view, partially sectioned, of a mirror arrangement specifically illustrating how mirrors may actually be mounted to accomplish steering and focusing of an initially collimated beam.

Referring now to FIG. 3, a mirror arrangement operating according to the principles of FIG. 1 is shown. Thus, in FIG. 3 all of the mirrors later to be identified are mounted so as to be rotatable together around a first line marked axis of rotation of all mirrors and all mirrors, except an entrance mirror, are mounted so as to be rotatable about a second line orthogonal to such first line. To permit rotation of all mirrors and to allow a beam from a source (not shown in FIG. 3) to be steered, a hollow shaft 21 is mounted in a journal bearing 22 which is affixed in any convenient manner on a base (not numbered). Means for rotating the hollow shaft 21, as for example a first motor 23 and a spur gear assembly 25, is provided. Affixed to the hollow shaft in any convenient manner is a stirrup 27. A second motor 29 is secured to the stirrup 27, in any convenient manner, along with a shaft 31 on which an entrance mirror 33 is affixed. With the longitudinal axis of the shaft 31 orthogonal to the line marked axis of rotation of all mirrors and the reflecting surface of the mirror 33 in the path of a beam (not shown but passing through the hollow shaft 21 substantially parallel to such longitudinal axis and through a corresponding opening in the stirrup 27), actuation of the first motor 23 causes the mirror 33 to rotate around such longitudinal axis with the result that the beam, after reflection from mirror 33, similarly rotates. If, further, as shown in FIG. 1, the reflecting surface of the mirror 33 is a portion of a paraboloid with its focal point lying at a point on the longitudinal axis of the shaft 31, the center line of the beam reflected from mirror 33 is substantially coincident with such axis. For reasons to be explained in detail in connection with FIGS. 4(A), 4(B) and 4(C), mirror 33 is mounted as shown to be movable transversely in a slide 34 with respect to the axis of rotation of all of the mirrors. Suffice it to say now that, if the focal point of the mirror 33 is displaced from such axis, the final focal point of the steered beam is directed along a line substantially orthogonal to the centerline of the steered beam. That is, the final focal point is moved in the same general way, but with a greater degree of precision, as it is moved by rotation of all mirrors except mirror 33.

The remaining elements of the arrangement to be described are rotatably supported on the shaft 31. Thus, a frame 35 is rotatably mounted, by way of a collar 37 integrally formed with (or attached to) such frame as shown. A sector gear 39 having its center of rotation on the longitudinal axis of the shaft 31 is affixed to the frame 35 so as to mesh with a gear 41 driven by the second motor 29. It may be seen, therefore, that when the second motor 29 is actuated, the frame 35 (and every element affixed thereto) is caused to rotate about the longitudinal axis of the shaft 31. Mirrors 43, 45 and 47 (corresponding respectively to mirrors 14, 16 and 18 in FIG. 1) are affixed as shown fo frame 35. Thus, as may be seen, mirrors 43 and 45 are attached to an annular ring 49 which in turn is attached to the frame 35. As indicated, both the frame 35 and the annular ring 49 have openings, not numbered, formed therein to allow the passage of the deflected beam from mirrors 43 to 45. To complete the assembly mirror 47 is affixed in any convenient manner to the frame 35. For reasons to become evident hereinafter mirror 47 is mounted, as in a slide 48, so as to be movable along a line parallel to the axis of rotation of all mirrors. Such motion, briefly, changes the range at which the finally steered beam is focused.

Figure 4:
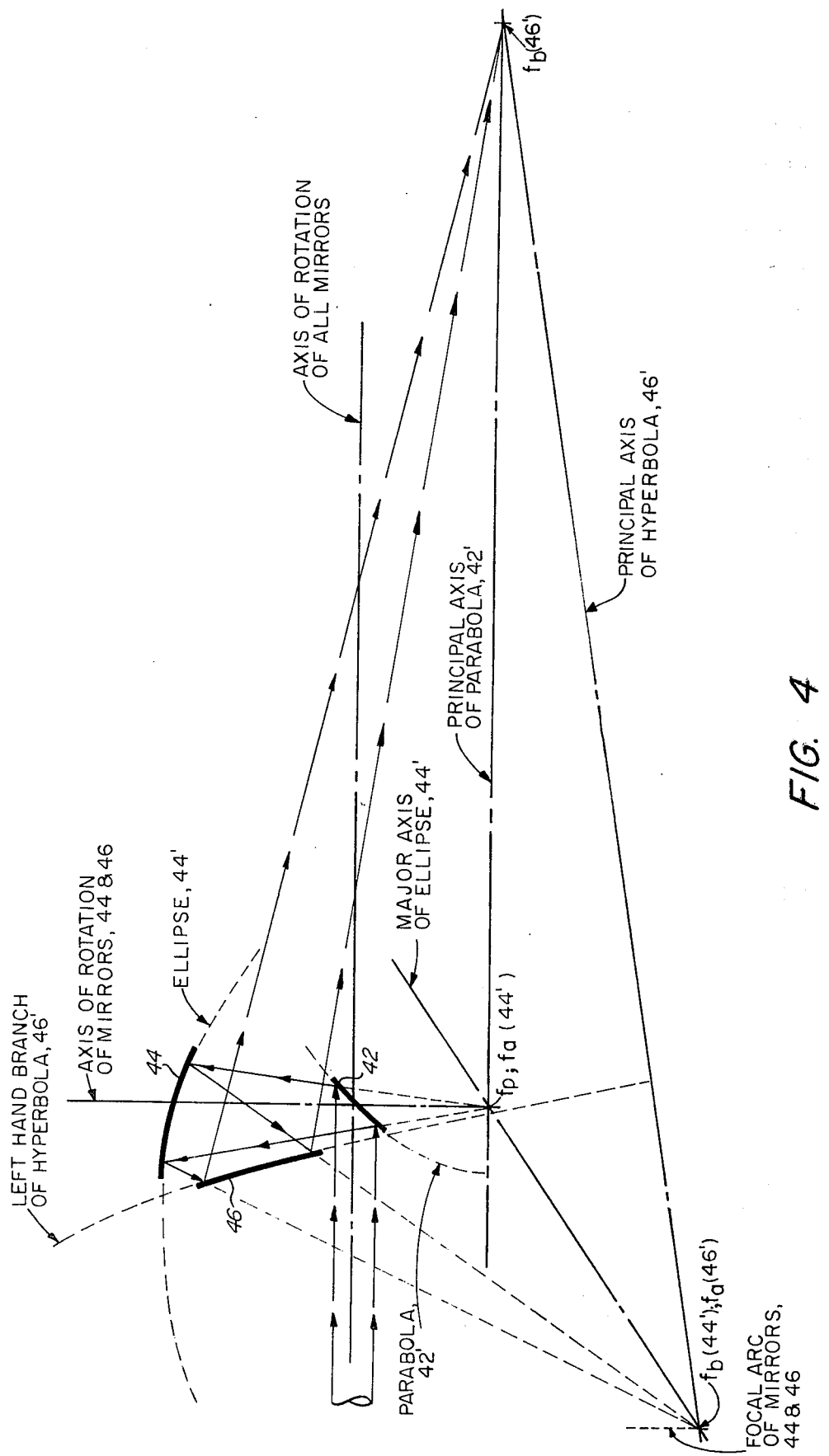
FIG. 4 is a cross-sectional sketch illustrating how three mirrors may be arranged to steer and focus a beam of radiant energy; and, FIGS. 4(A), 4(B), and 4(C) are sketches illustrating how displacement of one of the mirrors in the arrangement shown in FIG. 4 from a nominal position affects the final focal position of a steered beam of radiant energy.

Referring now to FIG. 4 it may be seen that the number of mirrors required to accomplish beam steering as illustrated in the previous FIGURES may be reduced to three. Thus, as shown in FIG. 4, an entrance mirror 42 and a mirror 44 are disposed to change the axial rays in a collimated beam (not numbered) to be steered to convergent rays. Such convergent rays are redirected by a mirror 46 to a focal point $fb(46')$.

In order that the axial rays in the collimated beam to be steered may be redirected in the manner just described, the reflecting surfaces of the various mirrors have the following shapes: (1) the entrance mirror 42 has a paraboloidal reflecting surface corresponding to the surface generated by rotating a parabolic segment (here designated by the segment in heavy line) of a parabola $42'$ partially about its principal axis; the mirror 44 has a reflecting surface correcponding to the surface generated by nutating an ellipsoidal segment (here designated by the segment in heavy line) of an ellipse $44'$ about the principal axis of the parabola $42'$; and the mirror 46 has a reflecting surface generated by nutating a hyperbolic segment (here designated by the segment in heavy line of the left hand branch) of a hyperbola $46'$ about the principal axis of the parabola $42'$. With one focal point, $fa(44')$, of the ellipse $44'$ coincident with the focal point, fp, of the parabola $42'$, the second focal point $fb(44')$ of the ellipse $44'$ coincident with one focal point, $fa(46')$, of the hyperbola $46'$ and the second focal point, $fb(46')$ of the hyperbola $46'$ on the principal axis of the parabola $42'$, axial rays in a beam to be steered are, therefore, directed to focus at $fb(46')$. It will be noted here that, because the reflecting surfaces of the mirrors 44 and 46 are generated by nutating segments of quadratic conic sections about a common line, the focal points $fb(44')$ and $fa(46')$ generate arcs of coincident circles normal to such line. Such arcs are indicated in FIG. 4 by the dotted line labeled "focal arc of mirrors 44 and 46". It follows then that axial rays in the beam to be steered which lie in the plane of the FIGURE are directed as illustrated and axial rays in such beam not lying in the plane of the FIGURE are directed (after reflection from mirror 44) toward points on the focal arc of mirrors 44 and 46 not conicdent with $fb(44')$. It is evident, therefore, that the cross-sectional area of the convergent beam reflected from mirror 44 is at any point along a line from such mirror to the focal point $fb(44')$ greater than the cross-sectional area of a convergent beam reflected from an ellipsoidal mirror having a reflecting surface equal in area to the reflecting surface of mirror 44. It follows, then, that the flux density of the convergent beam reflected from the mirror 44 (and also the flux density of the convergent beam reflected from the mirror 46) is less in the contemplated arrangement (and in the arrangements heretofore discussed) than would be possible if conventional ellipsoidal or hyperboloidal mirrors were used.

It will now be observed that the mirrors in FIG. 4 may be rotated to effect beam steering. Thus, if all three mirrors are rotated about the line marked axis of rotation of all mirrors the final result is that focal point $fb(46')$ is caused to be rotated along an arc of a circle about such line, the length of such arc being dependent upon the amount of rotation. On the other hand, if mirrors 44, 46 are rotated together about the line marked "axis of rotation of mirrors 44 and 46", the focal point $fb(46')$ is caused to rotate along an arc of a circle passing through the focal point $fb(46')$ and lying in a plane orthogonal to the plane of the arc traced by such focal point. In other words, the focal point $fb(46')$ may be directed to any point on a spherical cap of a sphere centered at the focal point $fp$ by rotating the mirrors in the ways just described.

It will be observed that the actual distance through which the focal point $fb(46')$ is caused to move by rotation of the mirrors 44, 46 relative to the mirror 42 is directly related to the range from the focal point $fp$ to the focal point $fb(46')$. A moment's thought will make it clear that the angular position of the mirrors 44 and 46 with relation to the mirror 42 may have to be controlled with an extremely high degree of precision to direct the steered beam to a point at any appreciable range. If, on the other hand, some increase of the cross-sectional size of the steered beam at the focal point $fb(46')$ may be tolerated, a relatively small change in the position of the steered beam from the focal point $fb(46')$ may be effected, in a manner now to be described, by "defocusing" the mirror arrangement shown in any of the FIGURES.

Referring particularly to the sketches shown in FIGS. 4(A), 4(B) and 4(C), the effect of defocusing when the focal point, $fp$, of the mirror 42 is not coincident with the focal point, $fa(44')$ of the mirror 44 may be seen. Thus, as shown in FIG. 4A, if the focal point, $fp$, is displaced along the principal axis of the parabola 42' by a distance, $dx$, to the focal point marked $fp(e)$, the principal ray (meaning the ray in the beam to be steered which is coincident with the longitudinal axis of such beam) would be reflected to point $RE(e)$ on the ellipse 44'. On reflection from point $RE(e)$, the principal ray would be aberrant by an angle, $e_1$. The now aberrant principal ray reflected from the point $RE(e)$ is, therefore, directed to the left of the coincident focal points $fb(44')$ and $fa(46')$. It follows that, when such ray is reflected from the mirror 46 at point $RH(e)$, it is aberrant (by an aberration angle, $e_2$,) from a ray directed toward focal point $fb(46')$. It will be observed that rays in the beam to be steered other than the principal ray are also subject to aberration in passing through the arrangement of FIG. 4A. It will be observed, moreover, that the degree of aberration suffered by rays other than the principal ray will differ with the final result that the rays converging on the principal axis of the parabola cross that axis at different ranges. In other words, the finally focused beam will not be aberration-free but rather will exhibit some degree of aberration akin to spherical aberration. It will also be observed that the range at which the steered rays cross the principal axis of the parabola may be caused to be less than the range to focal point $fb(46')$ by moving the mirror in the opposite direction to that shown.

Referring now to FIG. 4B, it may be seen that the focal point, $fp$, of the parabola 42' is displaced along a line orthogonal to both axes of rotation shown in FIG. 4 by a distance, $dy$, so that such focal point lies at a point marked $fp(ey)$. The aberration suffered by the principal ray, then, is (as shown in FIG. 4B) such as to cause that ray to be directed finally in a plane skewed to the plane defined by the axes of rotation (FIG. 4). Similarly, all of the other rays in the beam to be steered are directed in planes which are, to degrees determined by the distance $dy$, skewed to the plane defined by the axes of rotation (FIG. 4). It follows then that the rays in the finally steered beam adjacent to the focal point $fb(46')$ are aberrant in a manner akin to that due to coma. The centroid of such cross-section is displaced from the focal point $fp$ in a direction parallel to the line between the focal point $fp$ and the focal point $fp(ey)$.

Referring now to FIG. 4C, the effect of displacing the focal point $fp$ along the axis of rotation of the mirrors 44, 46 (FIG. 4) may be seen. In FIG. 4C the focal point $fp$ is shown displaced by a distance, $dz$, to a point $fp(ez)$. The rays in the beam to be steered are here aberrant in such a manner that the centerline of the beam at the focal point $fb(46')$ is displaced along a line 48 parallel to the axis of rotation of mirrors 44 and 46 (FIG. 4).

It will now be recognized that displacement of focal point, $fp$, of the mirror 42 along any, or all, of three orthogonal axes causes the steered beam to be displaced from the focal point $fg(46')$ by an amount and in a direction determined by the amount and direction of the displacement of the focal point, $fp$. It will also be recognized that displacement of the focal point $fp$ as shown in either FIG. 4(B) or FIG. 4(C) results in relatively small displacement of the steered beam in any plane orthogonal to the principal axis of the parabola 42'. Therefore, at the price of degradation of the shape of the steered beam adjacent to focal point $fp(46')$, "fine" steering of the beam may be effected. It will be noted that fine steering may also be accomplished, again at the price of introducing some aberration in the steered beam, by rotating the mirror 42 (FIG. 4) about the axis orthogonal to the axes shown in FIG. 4.

Having described preferred embodiments of this invention, it will now be apparent to a person skilled in the art that changes may be made without departing from the underlying concepts of my invention. For example, in certain circumstances, the convex entrance mirror shown in the various FIGURES may be operated by a concave mirror. When a substitution is made the divergent beam apparently originating at a focal point of the entrance mirror is replaced by a convergent beam (if the concave surface is paraboloidal) directed toward the focal point of such paraboloid. The point at which such a conversion beam actually is focused then may be selected by interposing a mirror similar to mirror 46 (FIG. 4). Similarly, if the concave mirror is hyperboloidal, such mirror may be substituted directly for the mirror 42 in FIG. 4. In view of the just mentioned modifications and in view of other modifications equally obvious, it is felt that this invention should not be restricted to its disclosed embodiments but rather should be limited only by the spirit and scope of the appended claims.

What is claimed is:

1. An improved catoptric arrangement for directing a laser beam, such arrangement comprising:
   a. a curved entrance mirror having a focal point, such mirror being rotatably mounted in the path of a laser beam to be steered, the reflecting surface of such mirror being inclined with respect to the longitudinal axis of such beam to redirect such beam away from such axis as though from the focal point;

b. a curved second mirror having at least one focal point coincident with the focal point of the entrance mirror disposed in the path of the beam reflected from the entrance mirror, the reflecting surface of such mirror being inclined with respect to the longitudinal axis of such reflected beam and being rotatable with respect thereto; and, c. selectively actuable means for rotating the entrance mirror, the second mirror and the focal points of such mirrors together about the longitudinaal axis of the laser beam to be steered and for rotating the second mirror about the longitudinal axis of the beam reflected for the entrance mirror.

2. An improved catoptric arrangement as in claim 1 wherein the reflecting surface of the entrance mirror corresponds in shape to the shape of a portion of a paraboloid adjacent its semilatus rectum, the principal axis of such paraboloid being parallel to, and spaced from, the longitudinal axis of the laser beam to be steered.

3. An improved catoptric arrangement as in claim 2 wherein the reflecting surface of the second mirror corresponds in shape to the shape of a portion of the curve formed by nutating a first ellipse about the principal axis of the paraboloid, one focal point of such first ellipse being coincident with the focal point of the paraboloid and the second focal point of such first ellipse being spaced from the longitudinal axis of the laser beam to be steered.

4. An improved catoptric arrangement as in claim 3 having, additionally:

a. a third mirror disposed in the path of the beam reflected from the second mirror to reflect such beam toward the longitudinal axis of the laser beam to be steered, the reflecting surface of such third mirror having a shape corresponding to the shape of a portion of the curve formed by nutating a second ellipse about the principal axis of the paraboloid, the first focal point of such second ellipse being coincident with the second focal point of the first ellipse and the second focal point of such second ellipse being spaced from the principal axis of the paraboloid at a greater distance than the first focal point; and b. a fourth mirror disposed in the path of the beam reflected from the third mirror, the reflecting surface of such fourth mirror having a shape corresponding to a portion of the curve formed by nutating a third ellipse about the principal axis of the paraboloid, the first focal point of such third ellipse being coincident with the second focal point of the second ellipse and the second focal point of such third ellipse being adjacent to the principal axis of the paraboloid.

5. An improved catoptric arrangement as in claim 4 having, additionally, means for displacing the entrance mirror relative to the second mirror.

6. An improved catoptric arrangement for directing a laser beam, such arrangement corprising:

a. an entrance mirror rotatably mounted in the path of a laser beam to be steered, the shape of the reflecting surface of such entrance mirror being convex and corresponding to the shape formed by rotating a portion of a hyperbola about the longitudinal axis of the beam to be steered, the second focal point of the hyperbola being coincident with the apparent origin of the laser beam to be steered;

b. a second mirror disposed in the path of the beam reflected from the entrance mirror, the reflecting surface of such mirror being inclined with respect to the longitudinal axis of such reflected beam and being rotatable with respect thereto; and c. selectively actuable means for rotating the entrance mirror and the second mirror together about the longitudinal axis of the laser beam to be steered and for rotating the second mirror about the longitudinal axis of the beam reflected from the entrance mirror.

7. An improved catoptric arrangement as in claim 6 having, additionally:

a. a third mirror disposed in the path of the beam reflected from the second mirror to reflect such beam toward the longitudinal axis of the laser beam to be steered, the reflecting surface of such third mirror having a shape corresponding to the shape of a portion of the curve formed by nutating a second ellipse about the longitudinal axis of the beam to be steered, the first focal point of such second ellipse being coincident with the second focal point of the first ellipse and the second focal point of such second ellipse being spaced from the longitudinal axis of the beam to be steered at a greater distance than the first focal point; and b. a fourth mirror disposed in the path of the beam reflected from the third mirror, the reflecting surface of such fourth mirror having a shape corresponding to a portion of the curve formed by nutating a third ellipse about the longitudinal axis of the beam to be steered, the first focal point of such third ellipse being coincident with the second focal point of the second ellipse and the second focal point of such third ellipse being adjacent to the longitudinal axis of the beam to be steered.

8. An improved catoptric arrangement as in claim 7 having, additionally, means for displacing the entrance mirror relative to the second mirror.

9. An improved catoptric arrangement for directing a laser beam, such arrangement comprising:

a. an entrance mirror rotatably mounted in the path of a laser beam to be steered, the reflecting surface of such entrance mirror corresponding in shape to a portion of a paraboloid to form a divergent beam apparently originating at the focal point of such paraboloid with the longitudinal axis of such divergent beam orthogonal to the longitudinal axis of the laser beam to be steered;

b. a second mirror disposed in the path of such divergent beam and rotatable around the longitudinal axis thereof, the reflecting surface of such second mirror corresponding in shape to the shape formed by nutating a portion of an ellipse around the principal axis of the paraboloid, such ellipse having one focal point of the paraboloid and having its major axis inclined with respect to the longitudinal axis of the beam to be steered;

c. a third mirror disposed in the path of the beam reflected from the second mirror, such third mirror being rotatable with the second mirror and having a reflective surface corresponding in shape to the shape formed by nutating a portion of a hyperbola around the principal axis of the paraboloid, such hyperbola having one focal point on the principal axis of the paraboloid and the second focal point coincident with the second focal point of the ellipse; and, d. selectively actuable means for rotating all mirrors around the longitudinal axis of the laser beam to be steered and rotating the second and third mirror around the longitudinal axis of the divergent beam reflected from the first mirror.

10. An improved catoptric arrangement as in claim 9 having, additionally, means for displacing the entrance mirror relative to the second mirror.

* * * * *